United States Patent [19]

Foote

[11] 3,943,738

[45] Mar. 16, 1976

[54] OUTBOARD MOTOR LOCK

[75] Inventor: Daniel J. Foote, Milwaukee, Wis.

[73] Assignee: Master Lock Company, Milwaukee, Wis.

[22] Filed: Nov. 1, 1974

[21] Appl. No.: 519,865

[52] U.S. Cl. .................................................. 70/232

[51] Int. Cl.$^2$ .......................................... F16B 41/00

[58] Field of Search .................. 70/19, 58, 178, 232

[56] References Cited

UNITED STATES PATENTS

| | | | |
|---|---|---|---|
| 2,825,218 | 3/1958 | O'Brien | 70/7 |
| 3,287,943 | 11/1966 | Vaughn et al. | 70/58 |
| 3,808,851 | 5/1974 | Kargus et al. | 70/232 |
| 3,848,441 | 11/1974 | Quinley | 70/232 |

*Primary Examiner*—Albert G. Craig, Jr.

*Attorney, Agent, or Firm*—Curtis B. Morsell, Sr.

[57] ABSTRACT

To prevent the theft, or accidental dislodgment during use of outboard motors, an elongated, hollow, slotted housing is provided which receives, covers, and renders inaccessible the head portions of the motor clamp screws. The housing is originally applied to the clamp heads by being slid thereover longitudinally and is provided in one wall with a pair of openings to receive the shackle legs of a padlock, the padlock body being introduced into the housing through an opening in another wall of the housing, and when the shackle legs are lockingly engaged with the confined padlock body, the latter functions as a stop to prevent unauthorized, longitudinal removal movement of the housing relative to the confined clamp heads. Major portions of the padlock body and shackle are also so shrouded that a thief or tamperer cannot successfully apply cutting or prying tools thereto.

2 Claims, 3 Drawing Figures

FIG - 1
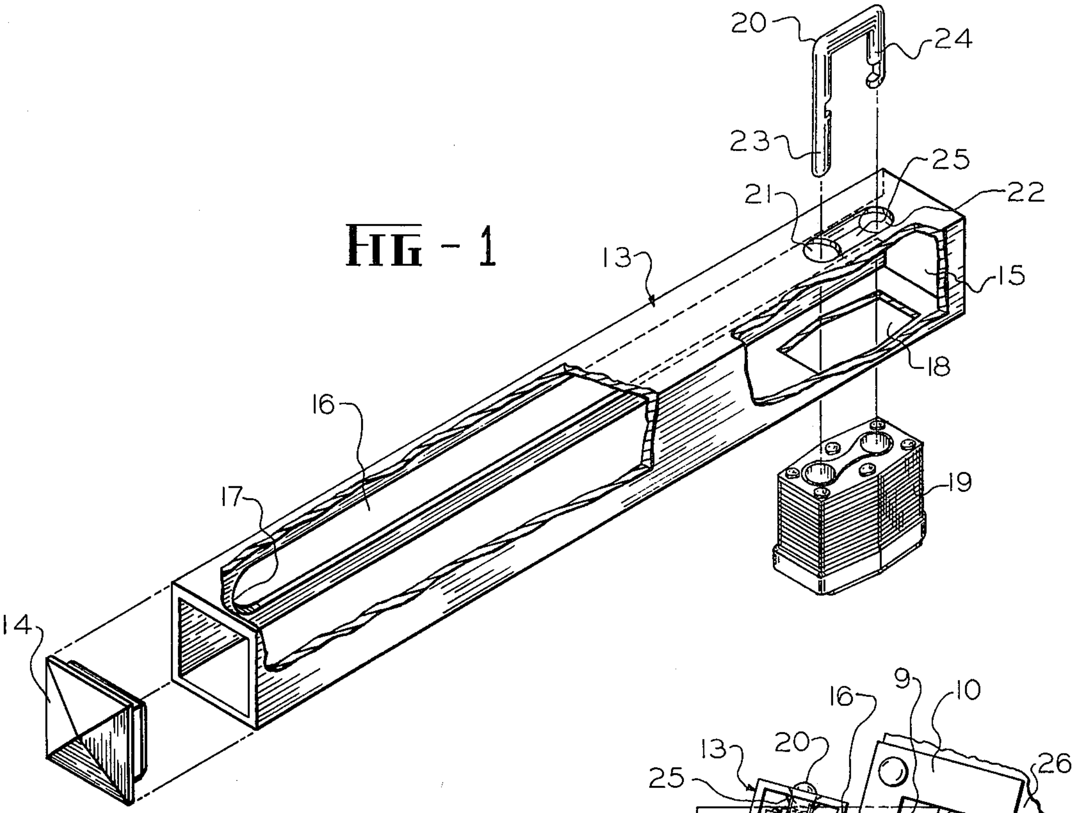
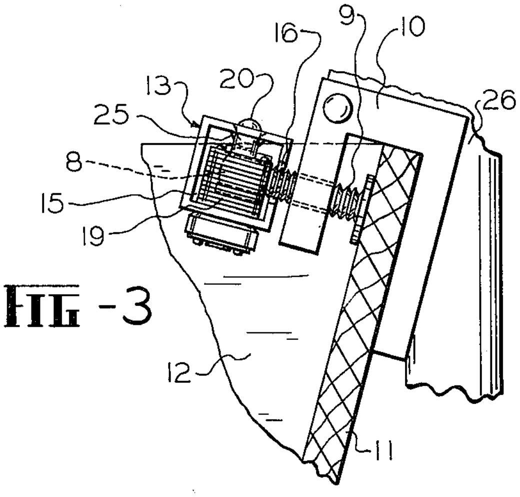
FIG - 3
FIG - 2
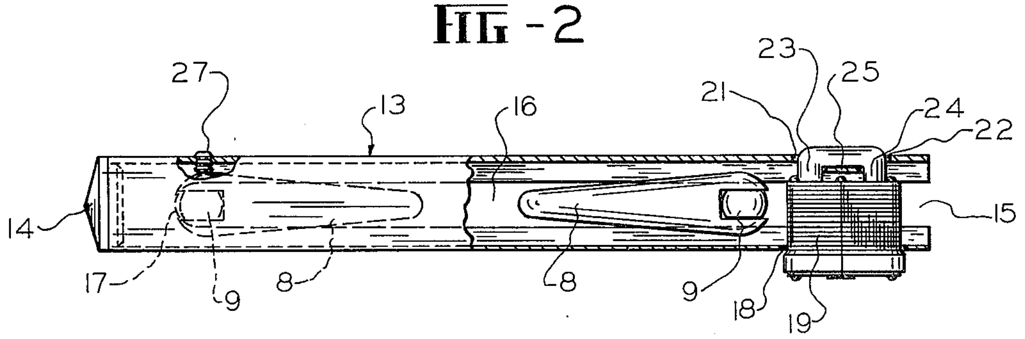

OUTBOARD MOTOR LOCK

BACKGROUND OF THE INVENTION AND SUMMARY THEREOF

A primary object of the present invention is to provide an outboard motor lock of the type which comprises a hollow slotted housing longitudinally slidably applied to the outboard motor clamp screws and heads wherein the housing is locked in position by a padlock whose inserted body portion fills an end section of the housing so as to be inaccessible to a thief or tamperer, which housed body portion also acts as a stop to prevent undesired longitudinal movements of said housing relative to the confined motor clamp screw heads.

A further object of the invention is to provide an outboard motor lock of the character described wherein a removable shackle, when applied to the housed padlock body, has its leg portions so protected and shrouded as to render the same relatively inaccessible to a tamperer's tool.

A further object of the invention is to provide an outboard motor lock of the character described wherein the elongated hollow housing is of square shape in cross-section, providing a maximum interior cross-sectional area for the accommodation of more diverse and larger motor clamp screw heads or handles, than can be accommodated by an equivalent housing of circular cross-section.

Further objects of the invention are to provide an outboard motor lock of the character described which is of simple construction, is inexpensive to manufacture, is easy to apply and remove, is reliable and effective for its intended purpose, and which will fit and can be used with most of the presently available outboard motors.

DESCRIPTION OF THE PRIOR ART

Applicant is aware of the Kargus et al. U.S. Pat. No. 3,808,851 and the Pavek U.S. Pat. No. 3,745,797, both of which relate to outboard motor locks of the tubular housing type applicable to the head portions of outboard motor mounting clamps but in said prior patents removable lock body portions do not act as stops within the housing to prevent undesired longitudinal removal movements of the latter and there is no prior art of which applicant has knowledge which shrouds the elements of an applied padlock as to render the same relatively inaccessible to a tool applied by a thief or tamperer.

BRIEF DESCRIPTION OF THE DRAWING

In the drawing wherein the same reference characters indicate the same or similar parts in all of the views:

FIG. 1 is an exploded perspective view of the outboard motor lock housing and its components with portions of the housing broken away and in section;

FIG. 2 is an outer face view of the housing applied to the head or handle portions of the screws of an outboard motor mounting clamp, with the padlock in its inserted, locked, operative condition and with portions of the housing broken away and in section; and FIG. 3 is a fragmentary, side elevational view showing the manner in which the improved outboard motor lock is applied to heads or handles of the clamps for a motor supporting bracket which secures a motor to a boat transom, for instance, the transom being shown in section.

DESCRIPTION OF THE PREFERRED EMBODIMENT

By way of example the improved outboard motor lock has been shown associated with the heads or handles 8 of clamp screws 9 which are used to affix outboard motor carrying clamps 10 to the transom 11 of a boat 12. As so utilized the locking device will prevent the theft, and/or accidental dislodgment during use, of an outboard motor (not shown), but the locking device is susceptible of more diverse applications. There may be some difference in the transverse spacing of the clamp screws applied to different models and makes of the clamps for outboard motors. Therefore, the present locking device is designed to accommodate variously spaced clamp screws without affecting the locking action of the device.

The major portion of the locking device is an elongated, hollow slotted housing of square shape in cross-section and generally indicated by the numeral 13. A housing about 11¼ inches in length and of 14 gauge thickness so as to provide within the housing a longitudinal opening of 1¼ inches, has been proven to be practical. One end of the housing (the left hand end relative to FIG. 1) is closed by a square cap 14 whose inner face flanges have a force fit with the inner wall portions of that end of the housing 13. The other end of said housing is open, as at 15. The inner face wall of the housing is formed with a longitudinal slot 16 closed at the left hand end, as at 17, but open at the other end where it communicates with the open right hand end 15 of the housing. The housing 13 is preferably of a durable metal. One wall of the housing 13, other than the wall which is formed with the slot 16 and adjacent the right hand end of the housing (relative to FIGS. 1 & 2) is formed with a generally rectangular opening 18 of a size and shape to permit the snug movement therethrough of the body 19 of a padlock, the padlock also including a detachable U-shaped shackle 20, which, when it is applied for locking purposes, as in FIGS. 2 & 3, has the free ends of its legs 23 & 24 initially inserted into circular openings 21 & 22 of a diameter to snugly receive the spaced shackle legs 23 & 24, said openings 21 & 22 being spaced apart a distance corresponding to the distance between said shackle legs, and being in a wall of the square housing 13 opposite that which is formed with the padlock body opening 18. Said shackle leg openings 21 & 22 are connected by a depressed trough 25 so that when the shackle is inserted and locked into the housing-contained padlock body 19, as in FIGS. 2 & 3, all portions of the shackle will be shrouded to render it difficult for the application thereto of a cutter or prying tool, by a thief.

When the outboard motor locking device is to be applied to the clamp screws 9 which affix the clamps 10 of an outboard motor-carrying bracket 26 to a support such as a boat transom 11, the clamp screw heads or handles 8 are alined, as in FIG. 2, and the elongated hollow housing 13 is slid over the handles 8 by being moved from left to right, relative to FIG. 2, the clamp screw shanks being accommodated by the slot 16 in the inner face of the housing 13. The sliding movement is terminated by the engagement of the left hand clamp screw with the closed end 17 of the slot 16. Then the padlock body 19, with the shackle 20 detached, is inserted into the right hand end of the housing by passing it through the wall opening 18 until the confined position of FIGS. 2 & 3 is attained. The illustrated padlock, incidentally, is key operated, but within the contemplation of the invention adaptations are possible for the use of a permutation padlock. With the padlock body 19 in its housed position, the shackle 20 is next applied. For this purpose, as previously mentioned, the shackle legs 23 & 24 are slid through the housing openings 21 & 22 to engage in the usual openings therefor in the padlock body. Ultimately the situation illustrated in FIGS. 2 & 3 is attained with the shackle legs being locked into the padlock body and the legs and outer end of the shackle being shrouded and protected.

The padlock body 19, being almost completely housed within the open end portion of the housing, acts as a stop to prevent unauthorized sliding movement of the housing relative to the clamp screws 9 and their handles. Thus, the locking device prevents theft of an outboard motor from a boat transom or other support, and guards against undesired dislodgment. When the housing of the locking device is applied, to prevent the housing from vibrating and rattling relative to the clamp screw and handle remote from the applied padlock body, a set screw 27 threaded through a wall portion of the housing and into impingement with a portion of said clamp screw, will accomplish the purpose.

The hollow housing 13, being of square form in cross-section has definite advantages as it provides a housing interior which gives a greater interior cross-sectional area for the accommodation of diverse and larger clamp screw heads than would an equivalent housing of circular cross section. Also, all of the external surfaces of the housing are flat and are in lineal contact with the exposed portions of the padlock, minimizing the cracks, or crevices wherein a cutting or prying tool might be inserted by a thief or tamperer.

The assemblage is free of manufacturing and operational complications, is easy to engage with the clamp screws of an outboard motor mounting bracket or to remove therefrom, is portable, and is well adapted for the purposes set forth.

What is claimed as the invention is:

1. In combination, a support; clamps for an outboard motor-carrying bracket; transversely spaced apart headed and shanked members for securing the clamps to said support; a slotted hollow housing of greater length than the transverse line of clamp securing members for longitudinal sliding application to said securing members with the shanks of latter being received by said housing slot and the securing member heads being confined within the housing, one end of the housing being open, there being a second opening in a wall portion of the housing adjacent to its open end and removed from the housing slot and of a size and shape to permit the snug passage therethrough of the body of a padlock; a shackle-equipped padlock formed with a body with the latter being removably introduced into said housing through said second opening transversely of the longitudinal axis of the housing, the padlock shackle being completely removable from the body, a wall of the housing opposite that which contains said second opening being formed with a third opening in registration with said second opening to permit the passage of the legs of the padlock shackle therethrough; and means for locking said padlock body against unauthorized removal from the housing, the padlock body forming a stop to prevent sliding movements of the housing relative to said securing members.

2. The combination recited in claim 1 wherein the housing is of rectangular form in cross-section with one side thereof containing said slot, another side thereof containing the second opening, and still another side containing said third opening.

* * * * *